(12) United States Patent
Kuo et al.

(10) Patent No.: US 12,086,390 B2
(45) Date of Patent: *Sep. 10, 2024

(54) METHOD FOR SHARING A CONSOLE VARIABLE SETTING OF AN APPLICATION AND THE ELECTRONIC DEVICE AND SYSTEM

(71) Applicant: Getac Technology Corporation, New Taipei (TW)

(72) Inventors: Chun-Yu Kuo, Taipei (TW); Da-Ke Liu, Taipei (TW); Shih-Hui Cheng, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,022

(22) Filed: Nov. 5, 2023

(65) Prior Publication Data

US 2024/0069693 A1 Feb. 29, 2024

Related U.S. Application Data

(62) Division of application No. 18/170,056, filed on Feb. 16, 2023, now Pat. No. 11,842,033.

(Continued)

(51) Int. Cl.
*G06F 3/0482* (2013.01)
*G06F 3/0485* (2022.01)
(Continued)

(52) U.S. Cl.
CPC .......... *G06F 3/0482* (2013.01); *G06F 3/0485* (2013.01); *G06K 7/1443* (2013.01); *G06K 19/06028* (2013.01)

(58) Field of Classification Search
CPC ... G06F 3/0482; G06F 3/0485; G06K 7/1443; G06K 19/06028
See application file for complete search history.

(56) References Cited

U.S. PATENT DOCUMENTS 9,459,827 B2   10/2016   Asada et al.
2001/0030662 A1*  10/2001  Ohkawa ................ G06F 3/0481
                                                             715/764

(Continued)

FOREIGN PATENT DOCUMENTS

CN    110287162 A    9/2019
CN    113365153 A    9/2021

(Continued)

OTHER PUBLICATIONS

Lee Lienhard: "Introduction to Ezconfig"; Honeywell; copyright 2013; pp. 1-43. (tutorial: EZConfig for Scanners "How to Use" guide (Tutorial) (honeywellaidc.com)).

*Primary Examiner* — Seth A Silverman
(74) *Attorney, Agent, or Firm* — McClure, Qualey & Rodack, LLP (57) ABSTRACT

A method for sharing a console variable setting of an application and the electronic device and system is provided. The sharing method includes: capturing a display frame of a first electronic device to obtain a set coding image by a second electronic device; transforming the set coding image into a meta file by the second electronic device, wherein the meta file comprises a set of setting parameters for a plurality of first setting options of a first application of the first electronic device; and setting a plurality of second setting options of a second application of the second electronic device as the set of setting parameters for the plurality of first setting options according to the meta file, wherein the second application is the same as the first application.

15 Claims, 8 Drawing Sheets

Related U.S. Application Data

(60) Provisional application No. 63/402,029, filed on Aug. 29, 2022.

(51) Int. Cl.
  *G06K 7/14* (2006.01)
  *G06K 19/06* (2006.01)

(56) References Cited

U.S. PATENT DOCUMENTS

| | | | |
|---|---|---|---|
| 2006/0015535 A1* | 1/2006 | Buchsbaum | G06F 9/542 |
| 2009/0195663 A1* | 8/2009 | Perotti | H04N 1/00342 |
| | | | 348/207.99 |
| 2017/0317879 A1 | 11/2017 | Wei et al. | |
| 2021/0256768 A1* | 8/2021 | Zhao | G06F 16/907 |
| 2022/0052870 A1 | 2/2022 | Guo et al. | |
| 2022/0124076 A1* | 4/2022 | Chaubey | H04L 63/0281 |

FOREIGN PATENT DOCUMENTS

| | | |
|---|---|---|
| CN | 114139169 A | 3/2022 |
| CN | 114554131 A | 5/2022 |
| EP | 2894931 A1 | 7/2015 |
| TW | I660606 B | 5/2019 |
| TW | I660606 B | 5/2019 |

* cited by examiner

METHOD FOR SHARING A CONSOLE VARIABLE SETTING OF AN APPLICATION AND THE ELECTRONIC DEVICE AND SYSTEM

CROSS-REFERENCE TO RELATED APPLICATION

This non-provisional application is a Division of application Ser. No. 18/170,056, filed on Feb. 16, 2023, claiming the priority benefit of U.S. provisional application Ser. No. 63/402,029, filed on Aug. 29, 2022. The entirety of the above-mentioned patent application is hereby incorporated by reference herein and made a part of the specification.

BACKGROUND OF THE INVENTION

The present invention relates to a parameter setting method of a plurality of electronic devices, and in particular, to a method for sharing a console variable setting of an application and a system with a plurality of electronic devices.

With the diversification of functions of electronic devices, many electronic devices will be equipped with control setting interfaces to adjust the detailed functions of the electronic devices. The electronic devices can adapt to different operating environments according to different functional combinations, for example, a point of sale information system (POS) machine of warehouse managers. For the warehousing of the same factory, each POS machine should be equipped with the same operating environment. The warehouse staff can use the POS machine without pressure even if a different POS machine from the previous one is obtained. Since related console variable settings of each electronic device need to be set one by one, the setting process takes a lot of labor and time.

SUMMARY OF THE INVENTION

In view of this, the present invention provides a method for sharing a console variable setting of an application and a system with a plurality of electronic devices, so as to quickly set the console variable settings of the same application of the plurality of electronic devices.

In some embodiments, the method for sharing a console variable setting of an application includes: capturing a display frame of a first electronic device to obtain a set coding image by a second electronic device; transforming the set coding image into a meta file by the second electronic device, wherein the meta file comprises a set of setting parameters for a plurality of first setting options of a first application of the first electronic device; and setting a plurality of second setting options of a second application of the second electronic device as the set of setting parameters for the plurality of first setting options according to the meta file, wherein the second application is the same as the first application.

In some embodiments, the plurality of first setting options comprises a checkbox, a checklist, a group of options, a dropdown list, a toggle switch, a label, or a text field, and types and an order of the plurality of second setting options are the same as those of the plurality of first setting options.

In some embodiments, the meta file further comprises a program information of the first application.

In some embodiments, the step of setting the plurality of second setting options of the second application of the second electronic device as the set of setting parameters for the plurality of first setting options according to the meta file comprises: selecting and executing, by the second electronic device, the second application the same as the first application according to the program information recorded in the meta file; and adjusting, by the second electronic device, a set of setting parameters for the plurality of second setting options of the second application with the set of setting parameters for the plurality of first setting options recorded in the meta file.

In some embodiments, the meta file further comprises locations, labels, and a setting order of the plurality of first setting options of the first application.

In some embodiments, a electronic device comprising a photographing unit, a storage unit, and a processing unit. The storage unit configured to store an application. The processing unit, connected to the storage unit and the photographing unit, configured to capture a display frame on an another electronic device through the photographing unit to obtain the set coding image, decode the set coding image to obtain a meta file, and set a plurality of setting options of the application according to the meta file, wherein the meta file comprises a set of setting parameters for a plurality of setting options of an another application of the another electronic device, the set application is the same as the another application of the another electronic device, and the processing unit sets the plurality of setting options of the application as the set of setting parameters for the plurality of setting options of the another application in the another electronic device according to the meta file.

In some embodiments, the meta file further comprises a program information of the another application in the another electronic device.

In some embodiments, the processing unit is further configured to select and execute the application stored in the storage unit according to the program information recorded in the meta file, and then adjust a set of setting parameters for the plurality of setting options of the executed application with the set of setting parameters recorded in the meta file.

In some embodiments, the plurality of setting options of the another application in the another electronic device comprise a checkbox, a checklist, a group of options, a dropdown list, a toggle switch, a label, or a text field, and types and an order of the set setting options of the application are the same as those of the setting options of the another application in the another electronic device.

In some embodiments, the meta file further comprises locations, labels, and a setting order of the further comprises setting options of the another application in the another electronic device.

In some embodiments, a system for sharing a console variable setting of an application, comprising a photographing unit, a storage unit, and a processing unit. The storage unit configured to store an application. The processing unit, connected to the storage unit and the photographing unit, configured to capture a display frame on an electronic device through the photographing unit to obtain the set coding image, decode the set coding image to obtain a meta file, and set a plurality of setting options of the application according to the meta file, wherein the meta file comprises a set of setting parameters for a plurality of setting options of an another application of the electronic device, the set application is the same as the another application of the electronic device, and the processing unit sets the plurality of setting options of the application as the set of setting parameters for the plurality of setting options of the another application in the electronic device according to the meta file.

In some embodiments, the meta file further comprises a program information of the another application in the electronic device.

In some embodiments, the processing unit is further configured to select and execute the application stored in the storage unit according to the program information recorded in the meta file, and then adjust a set of setting parameters for the plurality of setting options of the executed application with the set of setting parameters recorded in the meta file.

In some embodiments, the plurality of setting options of the another application in the electronic device comprise a checkbox, a checklist, a group of options, a dropdown list, a toggle switch, a label, or a text field, and types and an order of the set setting options of the application are the same as those of the setting options of the another application in the electronic device.

In some embodiments, the meta file further comprises locations, labels, and a setting order of the further comprises setting options of the another application in the electronic device.

Based on the above, according to the method for sharing a console variable setting of an application and the system with a plurality of electronic devices provided in any of the embodiments, the setting content of the setting option of the application can be conveniently acquired, and the same applications on other electronic devices are quickly set to the same setting parameters.

DETAILED DESCRIPTION OF THE INVENTION

Figure 1:
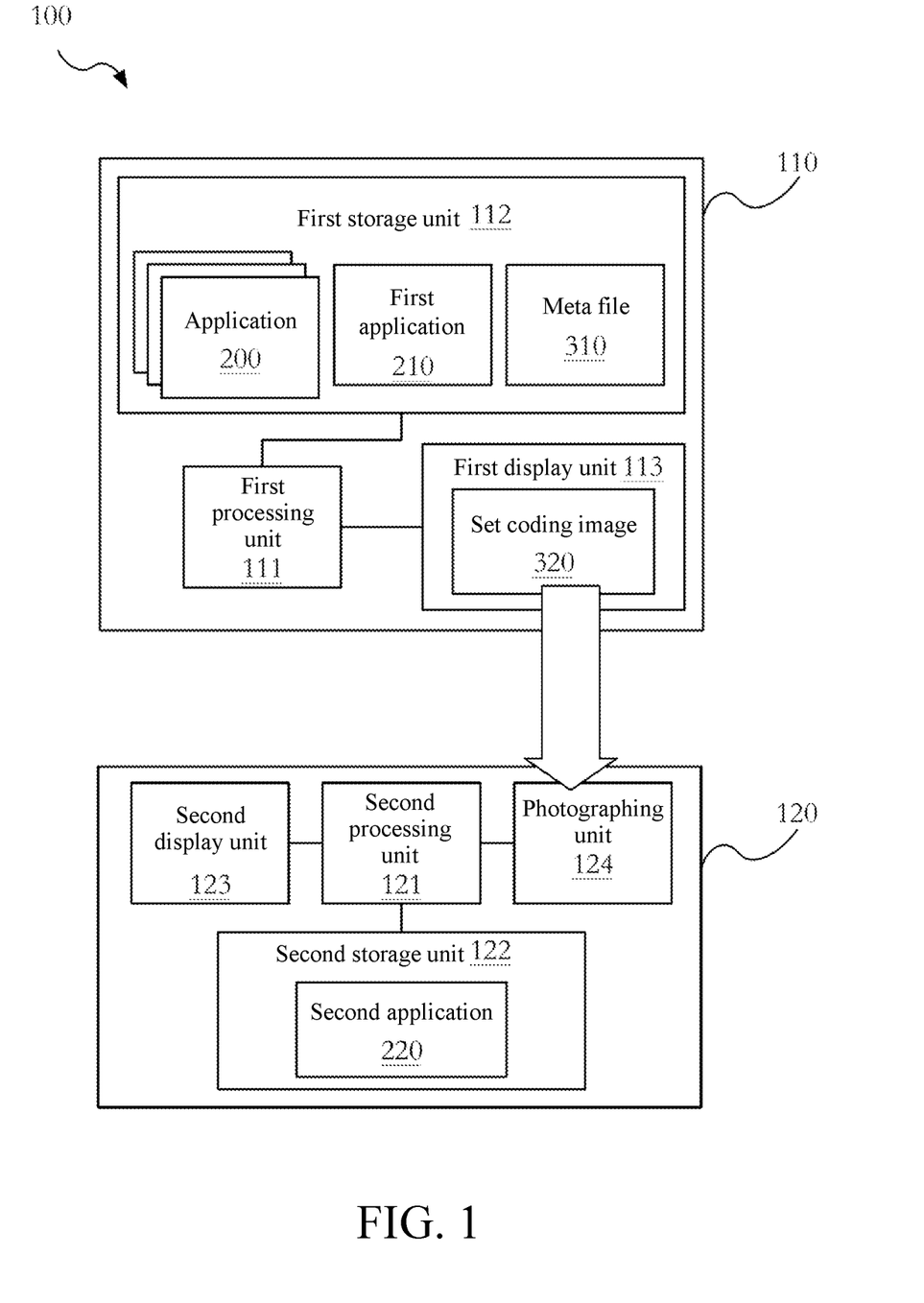
FIG. 1 is a functional schematic diagram of a system with a plurality of electronic devices according to an embodiment.

Referring to FIG. 1, a method for sharing a console variable setting of an application is applicable to a system with a plurality of electronic devices (referred to as a processing system 100 below). Two electronic devices are used as an example, which are respectively referred to as a first electronic device 110 and a second electronic device 120. The first electronic device 110 and the second electronic device 120 may be, but are not limited to, personal computers, notebook computers, tablet computers, mobile phones, bar-code scanner, or the like.

Figure 2:
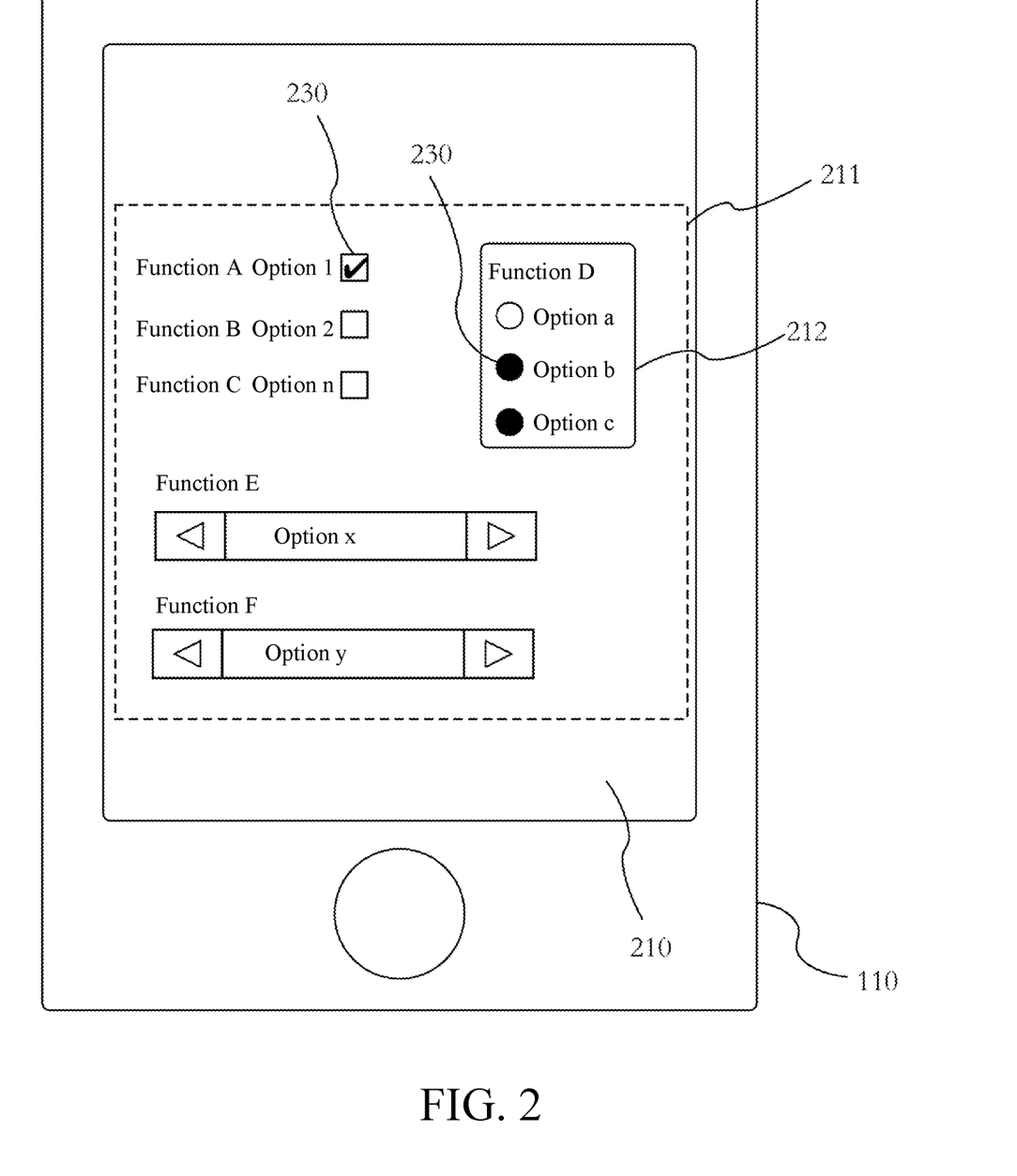
FIG. 2 is a schematic diagram of a first setting panel and setting parameters according to an embodiment.

The first electronic device 110 includes a first processing unit 111, a first storage unit 112, and a first display unit 113. The first processing unit 111 is connected to the first storage unit 112 and the first display unit 113. The first storage unit 112 stores a plurality of applications 200. A user may select one of the plurality of applications 200 through a user interface (not shown) of the first electronic device 110. In order to further distinguish between the selected applications 200, the selected application 200 in the first electronic device 110 is referred to as a first application 210. The first processing unit 111 executes the first application 210. The first application 210 has a setting panel (referred to as a first setting panel 211 below), as shown in FIG. 2. The first display unit 113 displays the first setting panel 211. The first setting panel 211 has a plurality of sets of setting options (referred to as first setting options 212 below), as shown in FIG. 2.

A type of the first setting options 212 may be a checkbox, a checklist, a group of options (radio or option), a dropdown list, a toggle switch, a label, or a text field. Each of the first setting options 212 has a setting parameter (that is, a set value indicating whether to select and/or a content to be selected) 230. For example, the setting parameter 230 of the checkbox is a Boolean variable, that is, a "true value" or a "false value". The setting parameter 230 in the group of options is a group composed of a plurality of sets of Boolean variables. The setting parameters 230 of the dropdown list and the text field are text strings.

Referring to FIG. 1 to FIG. 4, the first processing unit 111 reads set values (that is, the setting parameters 230) of the first setting options 212 through the first application 210 and generates a meta file 310 according to the setting parameters 230 of the first setting options 212 (step S410). In other words, the meta file 310 includes a plurality of first setting options 212 in the first application 210 of the first electronic device 110 and the setting parameters 230.

Figure 4:
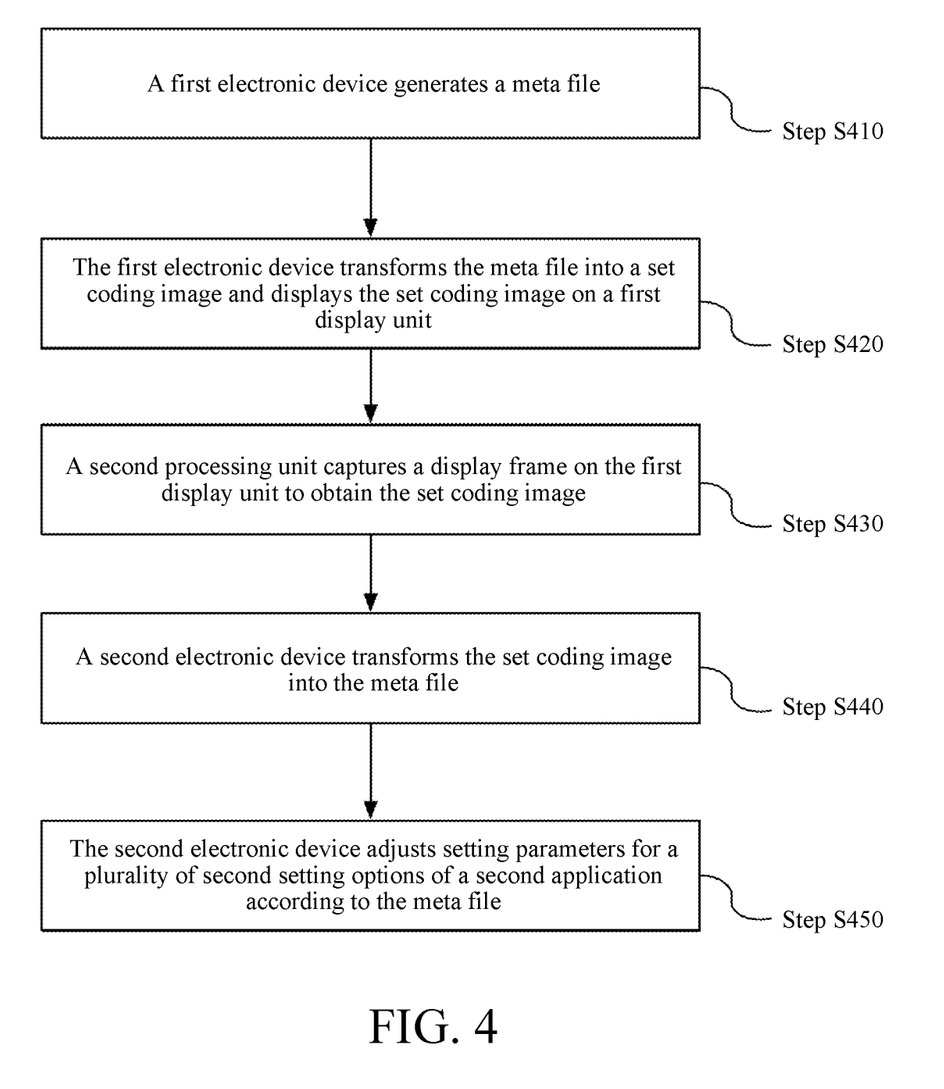
FIG. 4 is a schematic flowchart of a method for sharing a console variable setting of an application according to an embodiment.

Then the first processing unit 111 transforms the meta file 310 into a set coding image 320 through the first application 210, and displays a display frame with the set coding image 320 on the first display unit 113 (step S420), as shown in FIG. 4.

Figure 3:
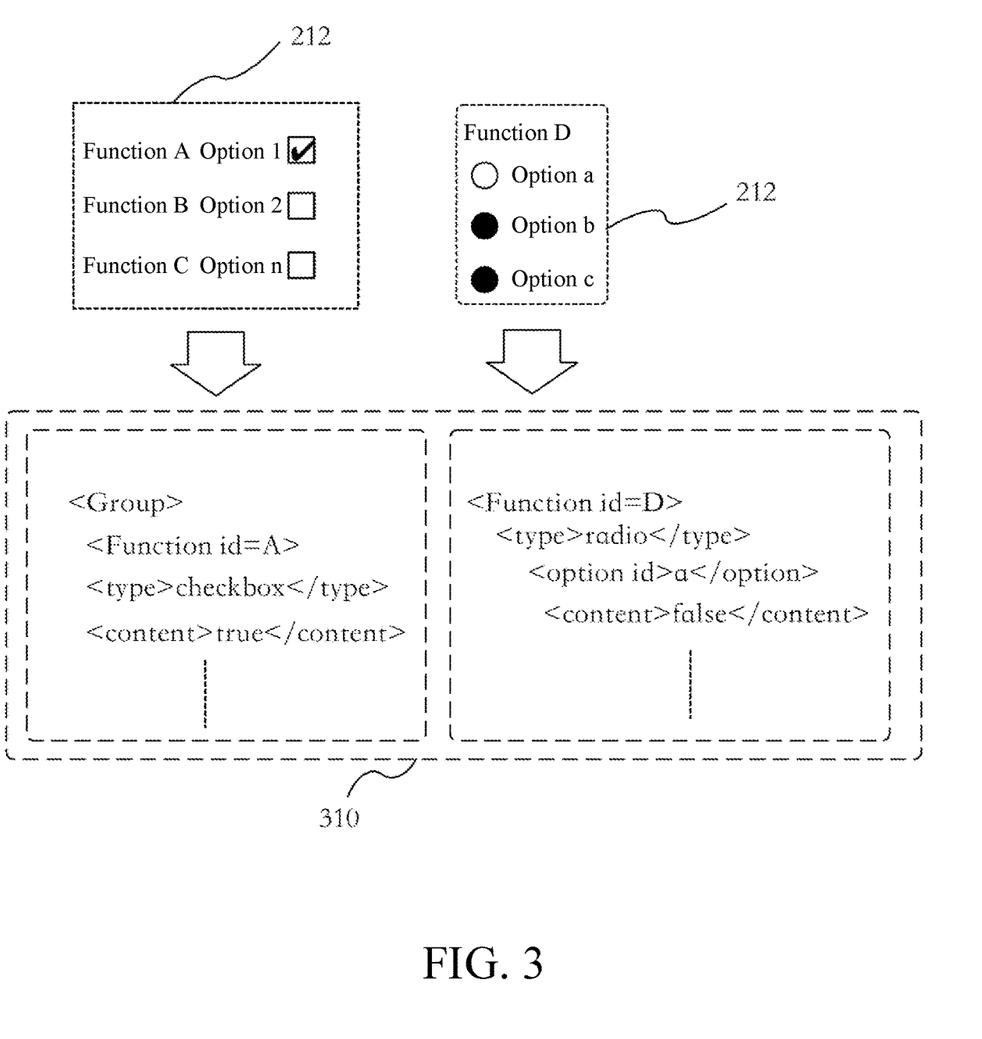
FIG. 3 is a schematic diagram showing transformation between setting parameters and a meta file according to an embodiment.

In some embodiments, the meta file 310 may be, but is not limited to, an extensible markup language (XML) or a lightweight markup language (Markdown). For example, the first processing unit 111 generates the corresponding tree text content in the XML file according to each group or option (that is, the setting parameter 230) in the first setting option 212, and then encodes the XML file into the set coding image 320. The content of the XML file in FIG. 3 is the setting parameter 230 corresponding to the first setting option 212 in FIG. 2. The first setting option 212 and the contents of the XML file shown in FIG. 3 are only examples, and are not limited thereto.

In some embodiments, the first processing unit 111 may store the generated meta file 310 in the first storage unit 112.

In some embodiments, the first processing unit 111 may respectively transform different kinds of first setting options 212 to a plurality of set coding images 320. In some other embodiments, the first processing unit 111 may also transform all of the first setting options 212 into a single set coding image 320.

In some embodiments, the set coding image 320 may be a 1D barcode (for example, Code 39, Code 2 of 5 Interleaved, an EAN-13 barcode, an EAN-8 barcode, or Code 128), a 2D barcode (for example, a QR code, PDF417, a composite barcode, or Data Matrix), or a combination thereof.

The second electronic device 120 includes a second processing unit 121, a second storage unit 122, a second display unit 123, and a photographing unit 124. The second processing unit 121 is connected to the second storage unit 122, the second display unit 123, and the photographing unit 124. The second storage unit 122 stores at least one application.

When the same application is to be set, the second processing unit 121 drives the photographing unit 124, and captures the display frame with the set coding image 320 on the first display unit 113 through the photographing unit 124 to obtain the set coding image 320 (step S430). Since the applications executed by the first electronic device 110 and the second electronic device 120 are the same, in order to distinguish between the two applications, the application executed by the second electronic device 120 is referred to as a second application 220, and the first application 210 and the second application 220 are the same application.

After obtaining the set coding image 320 (step S430), the second processing unit 121 transforms the set coding image 320 into the meta file 310 (step S440), and adjusts setting parameters 230 of a plurality of second setting options 222 of the second application 220 according to the meta file 310 (step S450).

Figure 8:
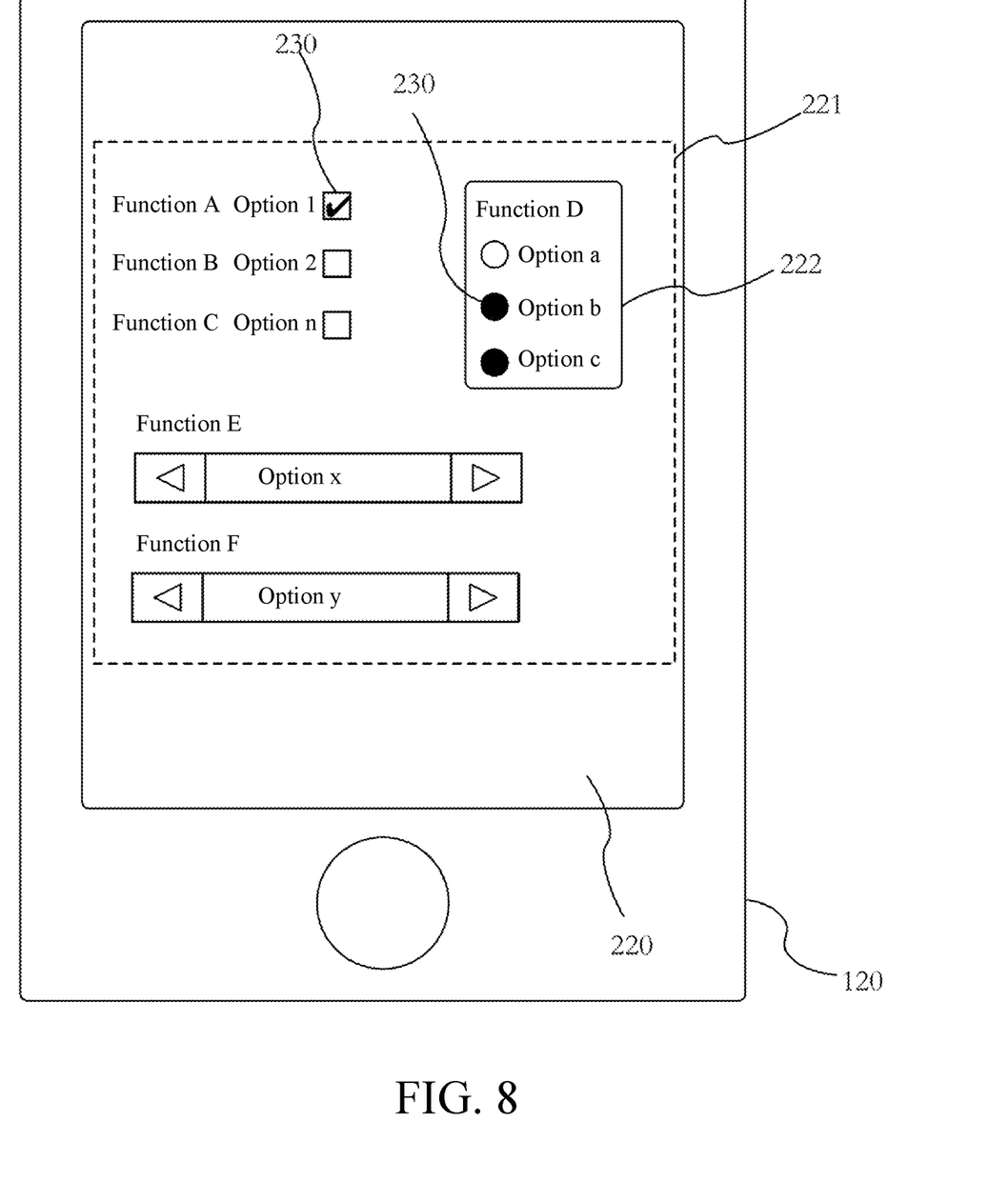
FIG. 8 is a schematic diagram of a second setting panel and setting parameters according to an embodiment.

In other words, the second application 220 has a second setting panel 221. Since the first application 210 and the second application 220 are the same application, a layout of the first setting panel 211 is the same as a layout of the second setting panel 221. The second setting panel 221 also has a plurality of setting options. The setting options of the second setting panel 221 are referred to as the second setting options 222. The items of the first setting options 212 are the same as the items of the second setting options 222. Before step S450, the setting content of the second setting options 222 (that is, the setting parameters 230) may be the same as or different from the setting content of the first setting options 212. After step S450, the setting content of the second setting options 222 is the same as the setting content of the first setting options 212, as shown in FIG. 2 and FIG. 8.

In some embodiments of step S410, the first processing unit 111 not only obtains the setting parameters 230 of the first setting options 212, but also obtains program information (for example, a software name and/or version information) of the first application 210, and then generates the meta file 310 with the corresponding text content by using the obtained setting parameters 230 and the program information. In some embodiments, the first processing unit 111 of the first electronic device 110 may record the program information of the first application 210 to a header of the meta file 310 according to a tree structure of the meta file 310.

In some embodiments, during generation of the meta file 310, the first processing unit 111 may sequentially generate a tree structure of the corresponding setting parameters 230 according to locations, labels, and a setting order of the first setting options 212, and record the tree structure in the meta file 310.

Figure 5:
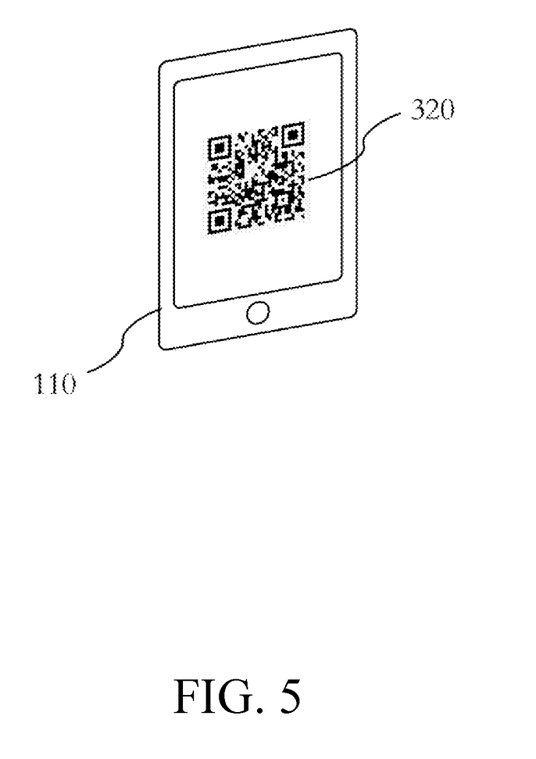
FIG. 5 is a schematic diagram of a set coding image according to an embodiment.
Figure 6:
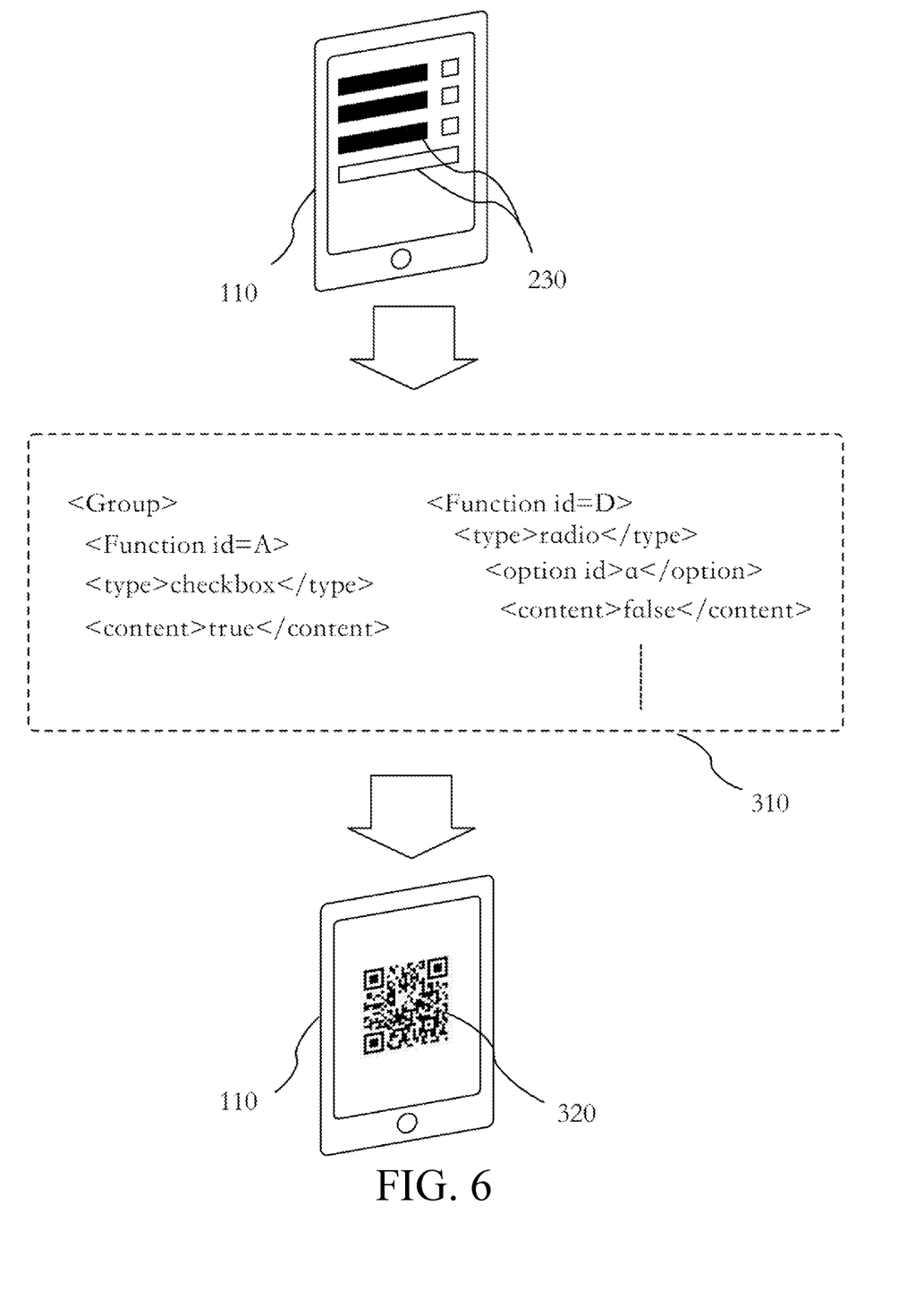
FIG. 6 is a schematic diagram showing that a first electronic device generates a set coding image according to an embodiment.

For example, the user selects the first application 210 through the user interface of the first electronic device 110 to cause the first processing unit 111 of the first electronic device 110 to run the first application 210. During the execution of the setting function of the first application 210, the first electronic device 110 provides and displays the first setting panel 211 with the plurality of first setting options 212 on the first display unit 113 (as shown in the upper diagram of FIG. 6) for the user to set the operating environment of the first application 210 through the user interface of the first electronic device 110. During the execution of the sharing function of the first application 210, the first processing unit 111 of the first electronic device 110 reads out program data representing the types and set values (that is, the setting parameters 230) of the first setting options 212 in the first setting panel 211, collects and records the program data in the XML file (that is, the meta file 310) with the text content of the tree structure corresponding to the setting parameters 230 (as shown in FIG. 6), and also records the program name (that is, program information) of the first application 210 in the header of the meta file 310. Then, the first processing unit 111 of the first electronic device 110 transforms the XML file into the QR code (that is, the set coding image 320) and displays the QR code on the screen (that is, the first display unit 113) (as shown in the lower diagram of FIG. 6). In FIG. 5 and FIG. 6, all of the first setting options 212 generate a single set coding image 320 by way of example, which is not limited in this way.

Figure 7:
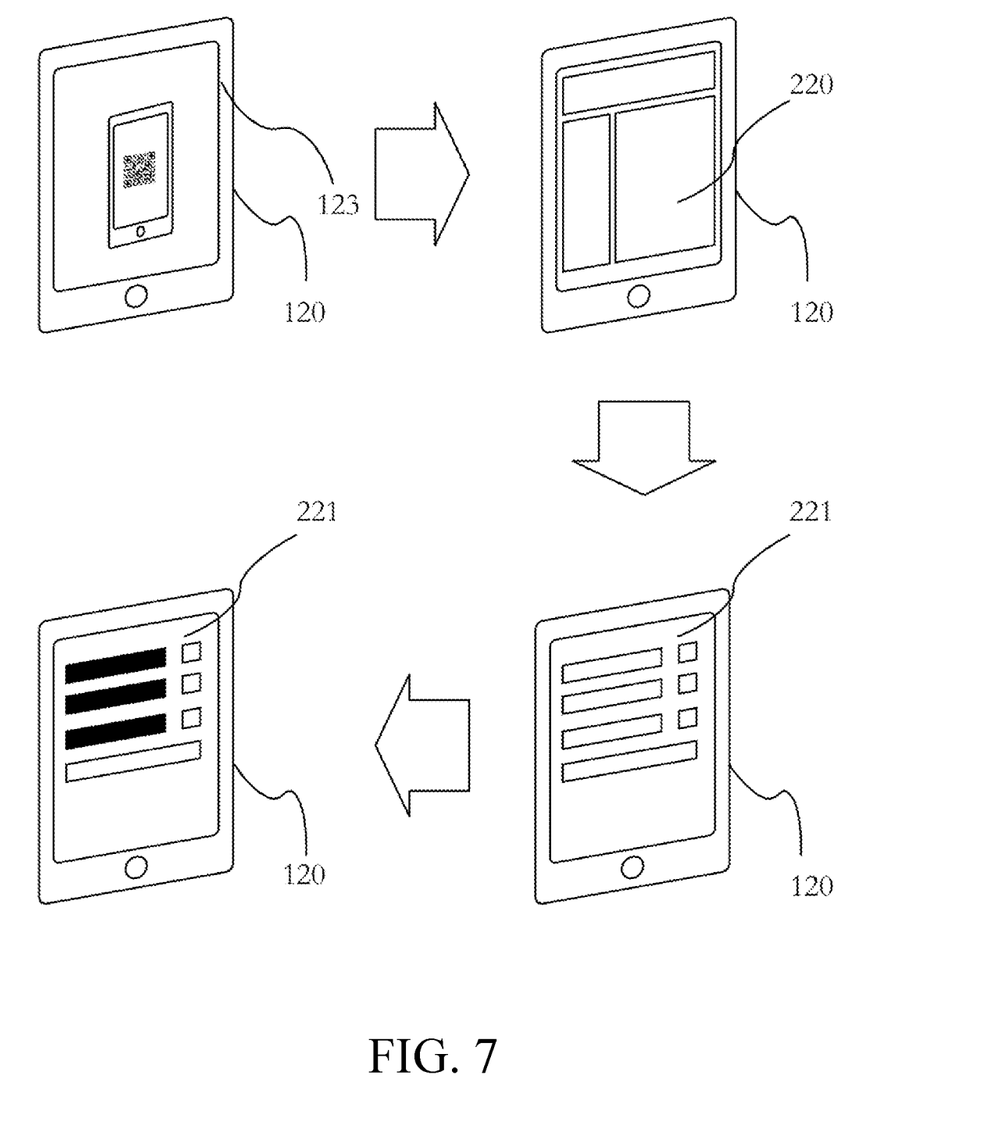
FIG. 7 is a schematic diagram showing that a second electronic device adjusts setting parameters by using the set coding image according to an embodiment.

During setting of the same application of the second electronic device 120, the user may capture a picture of the first electronic device 110 by using the photographing unit 124 of the second electronic device 120 (as shown in the upper left diagram of FIG. 7) to obtain the QR code, and then the second processing unit 121 decodes the QR code to obtain an XML file recording the text content of the tree structure corresponding to the setting parameters 230 and the header of the program name. Then, the second processing unit 121 selects the second application 220 according to the program name recorded in the header and executes the second application 220 (as shown in the upper right diagram of FIG. 7). After the second application 220 is executed, the second processing unit 121 transforms the text content of the tree structure corresponding to the setting parameters 230 into program data, and adjusts the setting parameters 230 of the second setting options 222 in the second setting panel 221 of the second application 220 (as shown in the bottom right diagram of FIG. 7) to be the same as the setting parameters 230 of the first setting options 212 with the program data (as shown in the bottom left diagram of FIG. 7). After the adjustment, the same setting options in the first setting panel 211 and the second setting panel 221 may be the same selected status or selected content.

In some embodiments, the first processing unit 111 may be implemented by one or more processors. The second processing unit 121 may also be implemented by one or more processors. Each of the processors may be, but is not limited to, a central processing unit (CPU), a System on Chip (SOC), a general-purpose or special-purpose microprocessor, a digital signal processor (DSP), a programmable controller, an application specific integrated circuit (ASIC), a programmable logic device (PLD), other similar processing devices, or a combination of the devices.

In some embodiments, the first storage unit 112 may be implemented by one or more storage elements. The second storage unit 122 may also be implemented by one or more storage elements. Each of the storage elements may be, but is not limited to, a memory, a memory card, or a register.

In some embodiments, the first display unit 113 may be, but is not limited to, a touch screen or a general display screen (that is, which has no touch function). The second display unit 123 may also be, but is not limited to, a touch screen or a general display screen (that is, which has no touch function). When the display unit (that is, the first display unit 113 and/or the second display unit 123) is a touch screen, the user interface may be the display unit, or may be an input device (a non-display unit) such as a keyboard, one or more buttons, a handwriting board, or any combination thereof that is additionally arranged.

In some embodiments, the photographing unit 124 may be implemented by a combination of a camera lens, a lens, and an image processor.

In some embodiments, the method for sharing a console variable setting of an application according to any embodiment may be realized by a computer program product. In other words, when an electronic device (that is, the first electronic device 110 and/or the second electronic device 120) loads and executes a program including a plurality of program codes, the method for sharing a console variable setting of an application in any embodiment can be performed. In some embodiments, the computer program product may be a readable recording medium, and the above program is stored in the readable recording medium for the electronic device to load. In some embodiments, the program itself may be a computer program product, and is transmitted to the electronic device in a wired or wireless manner.

Based on the above, according to the method for sharing a console variable setting of an application and the processing system 100 with a plurality of electronic devices provided in any of the embodiments, the setting content of an application installed in an electronic device (such as the first electronic device 110) can be conveniently acquired, and the same applications on other electronic devices (such as the second electronic device 120) are quickly set to the same setting parameters.

What is claimed is:

1. A method for sharing a console variable setting of an application, comprising:
   capturing a display frame of a first electronic device to obtain a set coding image by a second electronic device;
   transforming the set coding image into a meta file by the second electronic device, wherein the meta file comprises a set of setting parameters for a plurality of first setting options of a first application of the first electronic device; and
   setting a plurality of second setting options of a second application of the second electronic device as the set of setting parameters for the plurality of first setting options according to the meta file, wherein the second application is the same as the first application.

2. The method for sharing a console variable setting of an application according to claim 1, wherein the plurality of first setting options comprise a checkbox, a checklist, a group of options, a dropdown list, a toggle switch, a label, or a text field, and types and an order of the plurality of second setting options are the same as those of the plurality of first setting options.

3. The method for sharing a console variable setting of an application according to claim 1, wherein the meta file further comprises a program information of the first application.

4. The method for sharing a console variable setting of an application according to claim 3, wherein the step of setting the plurality of second setting options of the second application of the second electronic device as the set of setting parameters for the plurality of first setting options according to the meta file comprises:
   selecting and executing, by the second electronic device, the second application the same as the first application according to the program information recorded in the meta file; and
   adjusting, by the second electronic device, a set of setting parameters for the plurality of second setting options of the second application with the set of setting parameters for the plurality of first setting options recorded in the meta file.

5. The method for sharing a console variable setting of an application according to claim 1, wherein the meta file further comprises locations, labels, and a setting order of the plurality of first setting options of the first application.

6. An electronic device, comprising:
   a photographing unit;
   a storage unit, configured to store an application; and
   a processing unit, connected to the storage unit and the photographing unit, configured to capture a display frame on an another electronic device through the photographing unit to obtain the set coding image, decode the set coding image to obtain a meta file, and set a plurality of setting options of the application according to the meta file, wherein the meta file comprises a set of setting parameters for a plurality of setting options of an another application of the another electronic device, the set application is the same as the another application of the another electronic device, and the processing unit sets the plurality of setting options of the application as the set of setting parameters for the plurality of setting options of the another application in the another electronic device according to the meta file.

7. The electronic device according to claim 6, wherein the meta file further comprises a program information of the another application in the another electronic device.

8. The electronic device according to claim 7, wherein the processing unit is further configured to select and execute the application stored in the storage unit according to the program information recorded in the meta file, and then adjust a set of setting parameters for the plurality of setting options of the executed application with the set of setting parameters recorded in the meta file.

9. The electronic device according to claim 6, wherein the plurality of setting options of the another application in the another electronic device comprise a checkbox, a checklist, a group of options, a dropdown list, a toggle switch, a label, or a text field, and types and an order of the set setting options of the application are the same as those of the setting options of the another application in the another electronic device.

10. The electronic device according to claim 6, wherein the meta file further comprises locations, labels, and a setting order of the further comprises setting options of the another application in the another electronic device.

11. A system for sharing a console variable setting of an application, comprising:
   a photographing unit;
   a storage unit, configured to store an application; and
   a processing unit, connected to the storage unit and the photographing unit, configured to capture a display frame on an electronic device through the photographing unit to obtain the set coding image, decode the set coding image to obtain a meta file, and set a plurality of setting options of the application according to the meta file,
   wherein the meta file comprises a set of setting parameters for a plurality of setting options of an another application of the electronic device, the set application is the same as the another application of the electronic device, and the processing unit sets the plurality of setting options of the application as the set of setting parameters for the plurality of setting options of the another application in the electronic device according to the meta file.

12. The system for sharing a console variable setting of an application, to claim 11, wherein the meta file further comprises a program information of the another application in the electronic device.

13. The system for sharing a console variable setting of an application, to claim 11, wherein the processing unit is further configured to select and execute the application stored in the storage unit according to the program information recorded in the meta file, and then adjust a set of setting parameters for the plurality of setting options of the executed application with the set of setting parameters recorded in the meta file.

14. The system for sharing a console variable setting of an application, to claim 11, wherein the plurality of setting options of the another application in the electronic device comprise a checkbox, a checklist, a group of options, a dropdown list, a toggle switch, a label, or a text field, and types and an order of the set setting options of the application are the same as those of the setting options of the another application in the electronic device.

15. The system for sharing a console variable setting of an application, to claim 11, wherein the meta file further comprises locations, labels, and a setting order of the further comprises setting options of the another application in the electronic device.

* * * * *